Figure 1:
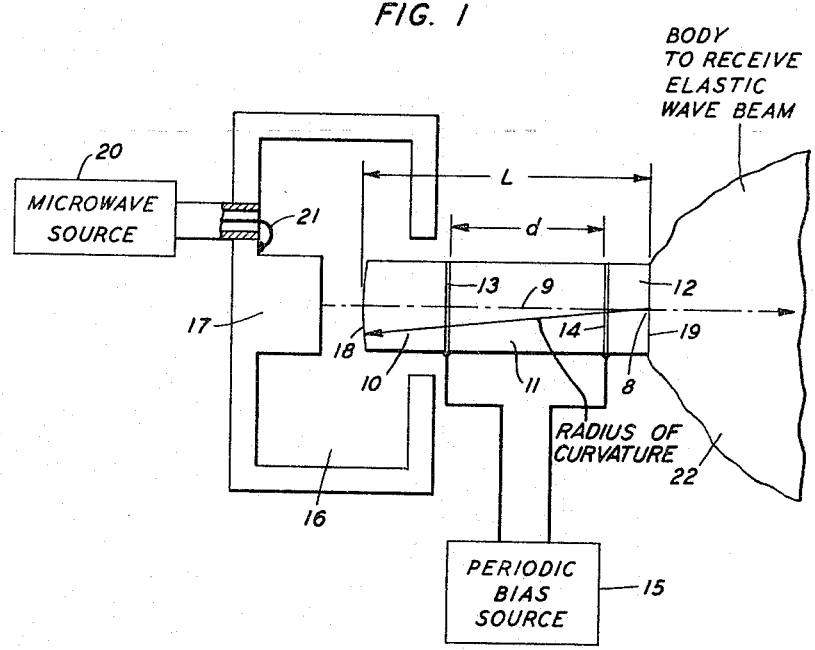

May 23, 1967 P. K. TIEN 3,321,647
ELASTIC WAVE GENERATOR OF HIGHLY RESOLVED AND CONCENTRATED BEAM
Filed Feb. 9, 1966

INVENTOR
P. K. TIEN
BY
*Roy M. Porter Jr.*
ATTORNEY

United States Patent Office 3,321,647
Patented May 23, 1967

3,321,647
ELASTIC WAVE GENERATOR OF HIGHLY RE-
SOLVED AND CONCENTRATED BEAM
Ping K. Tien, Chatham Township, Morris County, N.J.,
assignor to Bell Telephone Laboratories, Incorporated,
New York, N.Y., a corporation of New York
Filed Feb. 9, 1966, Ser. No. 526,243
9 Claims. (Cl. 310—8.1)

This invention relates to elastic wave devices and more particularly to generators of highly resolved and highly consentrated beams of elastic wave energy.

There is a need in indctrial and biological applications, as well as in communications applications for highly resolved beams of elastic wave energy. For example, a rapidly developing industrial field is that of non-destructive testing and examination. Other applications requiring highly concentrated elastic wave energy are described in the special issue on Ultrasonics, volume 53, Proceedings of the IEEE, October 1965. Conventional transducers generally produce energy dispersed over an area which is quite large compared to the area of intended application and resort has been had to the use of tapered probes which reduce the area but introduce substantial losses to the energy.

It is therefore an object of the present invention to generate highly concentrated elastic wave energy.

In accordance with the present invention dispersed piezoelectrically generated elastic wave energy is initially launched in an elongated elastic wave transmission medium bounded by critically spaced reflecting discontinuities formed at one end as the curvature of a spherical surface and at the other end as a plane surface. As the initial energy is multiply-reflected back and forth between the surfaces, it is collected and focused upon each reflection from the spherical surface. Interposed between the ends is means for introducing amplification timed to coincide with each reflected traversal of a fundamental mode that has components propagating parallel to the spherical axis. This fundamental mode grows in amplitude while other modes, miscellaneous echoes, reflections and other spurious signals having components which are not parallel to the spherical axis die out. Thus the fundamental is reduced in area according to the theory of spherical reflector interferometry to an infinitesimally small spot on the plane reflector independent in size from the initial energy distribution. The energy may then be withdrawn from the spot. The concentration is such that when employed as the energy source, for example, in a pulse echo detection system, the system effectively becomes an elastic wave microscope.

Figure 2A:
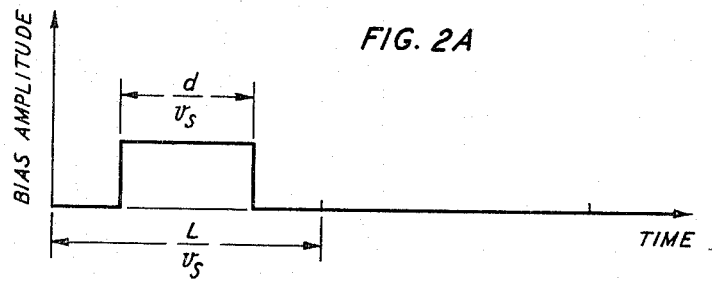
Figure 2B:
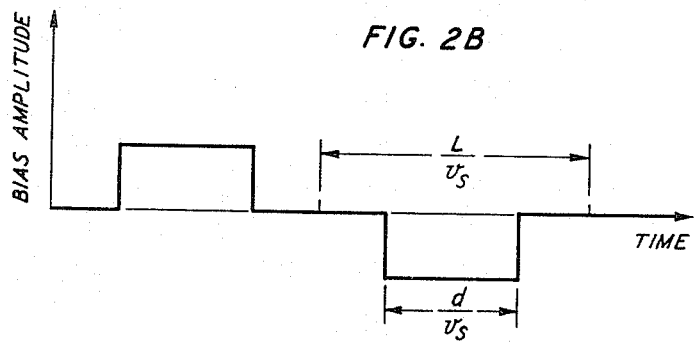

These and other objects and features, the nature of the present invention and its various advantages, will appear more fully upon consideration of the specific illustrative embodiments shown in the accompanying drawings and described in detail in the following explanation of these drawings, in which:

FIG. 1 is a schematic cross sectional view of an illustrative embodiment in accordance with the invention; and FIGS. 2A and 2B illustrate alternative periodic wave forms suitable for the bias source of FIG. 1.

Referring more particularly to FIG. 1, an illustrative embodiment of an elastic wave pulse generator is shown schematically comprising a composite elongated member made up of three successive, integrally connected and coaxial portions 10, 11 and 12. The forward portion 10 performs a wave generating and focusing function and as such comprises a body of piezoelectric material, such as quartz, that extends into microwave cavity 16 in the region of high electric field formed in the vicinity of center conductor 17. The end surface 18 of portion 10 within the cavity is machined or ground as a segment of a sphere which has a radius of curvature R with the effective center of the sphere lying on the common axis 9 of the portions. Surface 18 is characterized by a sharp acoustical impedance discontinuity which substantially completely reflects elastic waves impinging on it and thus acts as a spherical mirror to condense and focus these waves.

The terminal portion 12 cooperates with portion 10 for focusing and further serves as means for coupling elastic waves from the generator and as such may be made of any isotropic elastic wave transmission material such as glass, quartz, or vitreous silica. The exposed surface 19 is polished optically flat in a plane normal to axis 9 and spaced a distance $L=R$ from surface 18 so that surface 19 includes the spherical center point 8 of spherical surface 18.

Center portion 11, interposed between portions 10 and 12, performs the amplifying function and comprises a body of high resistivity, piezoelectric, semiconductive material having a length $d$. Specifically, the material of portion 11 may be one from Group III–V, such as gallium arsenide, gallium phosphide or indium arsenide or from Group II–VI, such as cadmium sulphide, cadmium selenide, cadmium telluride, zinc oxide or zinc selenide. It is preferable, although not necessary, that any of these materials be in single crystal form. Each end of portion 11 is provided with ohmic contacts 13 and 14 comprising, for example, metalized bonds between portions 10 and 11 and 11 and 12 respectively. A direct current bias varying at a period to be defined hereinafter is applied to contacts 13 and 14 from source 15.

In operation, an electromagnetic signal at microwave frequency, either pulsed or continuous, is derived from source 20 and applied to cavity 16 by way of coaxial probe 21. In accordance with the principles described in United States Patent 3,037,174, granted May 29, 1962 to H. E. Bommel et al., the microwave field in cavity 16 generates in piezoelectric portion 10, corresponding elastic waves which propagate away from the cavity 16 along axis 9. The energy initially is distributed more or less as a plane wave front throughout the cross section of portion 10. The energy enters portion 11 and experiences the phenomenon of solid state amplification as disclosed by D. L. White in United States Patent 3,173,100, granted Mar. 9, 1965, and in an article on page 237 of volume 7 of the Physical Review Letters (1961). Thus an elastic wave propagating through a high resistivity piezoelectric semiconductor under the influence of proper external D.C. bias, grows in amplitude as the wave propagates and will have maximum gain for components propagating parallel to the bias at a given frequency when the average drift velocity of the carriers in the semiconductor responsive to the D.C. field exceeds the velocity of sound in the medium. A backward travelling wave, such as that produced by reflection, has a negative velocity ratio that produces a loss that is generally less than the forward gain.

The amplified energy then passes into and through section 12 where it encounters the sharp acoustical impedance discontinuity of surface 19. A further structure 22 mechanically connected to surface 19 will receive some of this energy but a large portion of it will be reflected back toward surface 18 for subsequent reflection. Now if the bias from source 15 has a waveform such as illustrated in FIG. 2A, that is, has a period $2L/v_s$ in the form of a uni-directional pulse of length $d/v_s$ where $v_s$ is the velocity of sound in sections 10, 11 and 12, then the bias changes in synchronism with the multiply-reflected energy and section 11 will amplify the wave during its period of transit $d/v_s$ there-through only from section 10 toward terminal section 12. Alternatively, if the bias varies as illustrated in FIG. 2B, that is, has a polarity alternating with positive and negative values at the same period as in FIG. 2A, then the elastic wave energy is amplified during its travel within section 11 in both directions. In either case the initially applied energy is amplified in bursts during passage through section 11. While it is not necessary for the bias pulse to be restricted to a duration $d/v_s$, this relationship is preferred since it tends to discriminate against reflections from the interfaces 13 and 14 in favor of the desired reflections from surfaces 18 and 19 which synchronize with the duration of the bias.

In accordance with the invention the amplitude of the bias voltage from source 15 either according to FIG. 2A or 2B is set according to the principles defined by White so that the round-trip gain for elastic wave components propagating more or less parallel to axis 9 and therefore parallel to the field between electrodes 13 and 14 just exceeds the round-trip losses. These losses of course include energy intentionally withdrawn from the system. Components which propagate at large angles to axis 9 experience less gain and are therefore overcome by the losses. Thus after several multiple reflections, only those components of the originally dispersed energy that propagate at small angles to axis 9 and that pass precisely through point 8 along paths that are normal to surface 18 remain. The significance of these limitations will be understood when it is recalled that in any reflecting interferometer, only rays restricted to respective paths can be supported. When $L=R$ in the structure of FIG. 1 the only rays arriving normal to surface 18 are those which pass through point 8 and only those normal to surface 18 can be reflected back along the path over which they arrive. The spot of elastic wave energy thus formed at point 8 will theoretically be infinitely small and will in practice be enlarged only slightly by diffraction.

Thus when body 22 is mechanically coupled to surface 19, as for example by pressing the body 22 upon surface 19 with an interposed film of unctuous material such as grease, a sharply defined beam made up of successive bursts of elastic wave energy will pass into body 22. The frequency of the elastic wave energy within each burst is determined by that of source 20, the repetition rate of the bursts by the length L and their duration by the length $d$. Any of these parameters may be varied independently of the others to produce a form of energy required for a given application.

It should be understood that the illustrated initial source of elastic wave energy comprising source 20 and cavity 12 is merely illustrative to the preferred form of the invention and that elastic wave energy may be initially generated within section 10 by any other transducer form familiar to the art. It should be further understood that even in the absence of a specific frequency determining source, random noise within the bodies will build up as described into sharply defined bursts.

Finally it should be understood that body 22 is merely symbolic of the medium into which a highly resolved and concentrated beam of elastic wave energy is to be directed for a given application. It may for example be another elastic wave device such as a delay line or a Debye-Sears cell. It may be living tissue in one of the several biological, medical or surgical techniques and experiments. It may alternatively be a manufactured body which is to be examined microscopically for flaws by a nondestructive pulse-echo detection system.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An elastic wave device comprising a pair of spaced acoustical reflectors disposed along a common axis, at least one of said reflectors having a spherical surface with the center of curvature thereof located upon the other of said surfaces, and means interposed between said surfaces for introducing a gain to multiple reflections of elastic waves between said surfaces that is maximum for waves having a principal component propagating parallel to said common axis and less than said maximum for waves having a principal component propagating at angles to said common axis.

2. A device according to claim 1 including means associated with said one reflector for launching elastic wave energy directed toward the other of said reflectors.

3. A device according to claim 1 wherein the other of said reflectors has a plane surface.

4. A device according to claim 3 including means for withdrawing elastic wave energy from said plane surface.

5. A device according to claim 1 wherein said means for amplifying comprises an elongated body of material which has both piezoelectric and semiconductive properties extending along said axis, and means for establishing an electric field in said body along said axis.

6. The device according to claim 5 wherein said electric field is periodic at a rate equal to twice the spacing between said reflectors divided by the velocity of elastic wave energy travelling between said reflectors.

7. An elastic wave device according to claim 1 wherein said reflectors are formed by the end surfaces of an elongated solid body at least a portion of which has both piezoelectric and semiconductive properties, at least one of said ends having the curvature of said spherical surface with the spherical axis thereof extending along said common axis.

8. An elastic wave device comprising a two ended elongated body at least a portion of which has both piezoelectric and semiconductive properties, at least one of said ends of said body having the curvature of a spherical surface having a spherical axis extending along said body, said spherical surface having a center of curvature falling upon the intersection of said axis with the other of said ends, means for introducing elastic wave energy to said body, and means for establishing an electric field in said portion along said axis which acts in concert with the piezoelectric and semiconductive properties of said portion to cause a fundamental mode of multiple reflections between said ends to grow in amplitude to the exclusion of other modes.

9. The combination according to claim 8 wherein said electric field is periodic and is synchronized to coincide in said portion with multiple reflections of said wave energy between the ends of said body.

References Cited by the Applicant
UNITED STATES PATENTS 3,173,100    3/1965    White.

ROY LAKE, *Primary Examiner.*

D. HOSTETTER, *Assistant Examiner.*